(12) United States Patent
Nelson et al.

(10) Patent No.: US 12,386,606 B2
(45) Date of Patent: Aug. 12, 2025

(54) SYSTEMS AND METHODS FOR CONTAINER IMAGE UPGRADE (71) Applicant: Robust Intelligence LLC, San Jose, CA (US)

(72) Inventors: Blaine Nelson, San Francisco, CA (US); Jong Hyun Lee, San Francisco, CA (US); James Conant, Larkspur, CA (US); Chris Sreesangkom, San Francisco, CA (US); Zhen Li, Sunnyvale, CA (US); Marco Sanvido, Belmont, CA (US)

(73) Assignee: ROBUST INTELLIGENCE LLC, San Jose, CA (US)

(*) Notice: Subject to any disclaimer, the term of this patent is extended or adjusted under 35 U.S.C. 154(b) by 103 days.

(21) Appl. No.: 18/215,564

(22) Filed: Jun. 28, 2023

(65) Prior Publication Data
US 2024/0004631 A1    Jan. 4, 2024

Related U.S. Application Data (60) Provisional application No. 63/357,483, filed on Jun. 30, 2022.

(51) Int. Cl.
G06F 8/65 (2018.01)
G06F 8/61 (2018.01)

(52) U.S. Cl.
CPC . G06F 8/65 (2013.01); G06F 8/63 (2013.01)

(58) Field of Classification Search
None
See application file for complete search history.

(56) References Cited

U.S. PATENT DOCUMENTS 11,042,366 B2    6/2021  Gibbs et al.
11,243,758 B2 *  2/2022  Mamgain ................. G06F 8/65
11,960,870 B2 *  4/2024  Li ........................ G06F 9/45558
(Continued)

OTHER PUBLICATIONS

Dobies et al., "Kubernetes Operators—Automating the Container Orchestration Platform," Mar. 2020, O'Reilly Media Inc., 155 pages.

(Continued)

Primary Examiner — Marina Lee
(74) Attorney, Agent, or Firm — Baker Botts L.L.P.

(57) ABSTRACT

Systems and methods for upgrading container images within orchestration systems. In various embodiments, a request to run a custom container image can be received. Subsequently, a determination can be made as to whether the current version of the requested custom container image is built upon a most recent version of a corresponding base container image. Where it is determined that the current version of the requested custom container image is not built upon the most recent version of the corresponding base container image, an upgraded version of the custom container image can be generated. Advantageously, a non-privileged user requesting a custom container image can, leveraging the private access token and/or administrative privileges of the system, be able to upgrade the requested custom container image. Custom container images can be automatically upgraded, and relied upon to be up-to-date when used, without burdening the user.

20 Claims, 9 Drawing Sheets (56) References Cited

U.S. PATENT DOCUMENTS

| | | | |
|---|---|---|---|
| 12,242,844 B2* | 3/2025 | Ross | G06F 8/71 |
| 2019/0114164 A1* | 4/2019 | Wong | G06F 8/658 |
| 2020/0364039 A1* | 11/2020 | Gibbs | G06F 8/65 |
| 2021/0382846 A1* | 12/2021 | Miller | G06F 15/17331 |

OTHER PUBLICATIONS

International Search Report and Written Opinion in PCT/US2023/069271, mailed Sep. 29, 2023, 14 pages.

\* cited by examiner

SYSTEMS AND METHODS FOR CONTAINER IMAGE UPGRADE

CROSS-REFERENCE TO RELATED APPLICATIONS

This application claims priority to U.S. provisional patent application Ser. No. 63/357,483, filed on Jun. 30, 2022. Priority to the provisional patent application is expressly claimed, and the disclosure of the provisional application is hereby incorporated herein by reference in its entirety and for all purposes.

FIELD

The present disclosure relates generally to orchestration systems, and more specifically, but not exclusively, to systems and methods for upgrading container images.

BACKGROUND

Orchestration systems, such as Kubernetes (K8s), provide for the creation, use, and management of distributed applications. These distributed applications can be made up of one or more programs (e.g., microservice programs) that work in concert—for example, programs that each accept input data, perform one or more operations, and output corresponding result data. In order to use such a program in connection with K8s (or another orchestration system), a container image can be created for the program. The container image for a given program can provide both the program itself and dependencies of the program. As just some examples, these dependencies can include libraries (e.g., a particular version of PyTorch), runtimes (e.g., a particular version of Python), and/or system requirements (e.g., a particular version of an operating system). A configuration file can also be included in a container image that provides, for example, entry point, networking setup, and namespace information.

A given container image typically builds upon one or more other container images according to an overlay system. In this way, the given container image can inherit, add, remove, or replace container elements (e.g., program code and/or libraries) relative to a preceding container image upon which it builds. Accordingly, a custom container image deriving from a base container image can be created, such as a custom container image that adds libraries relative to the base container image.

However, difficulties can arise where the custom container image derives from a given version of a base container image and that version of the base container image becomes deprecated, because under this circumstance the custom container image can inherit undesirable functionality from the deprecated base container image.

As just an example, deprecation of the base container image can occur where the base container image interfaces with a backend, and a new version of the base container image has been released, in order to ensure compatibility with a change to the backend. Here, where the custom container image derives from the old version of the base container image, the custom container image can experience difficulties when interfacing with the changed backend. As just another example, deprecation of the base container image can occur where a new version of the base container image is released in order to address a security concern. Here, where the custom container image derives from the old version of the base container image, the custom container image can continue to suffer from the security concern.

Accordingly, when a base container image is deprecated, there is a call to create new versions of dependent custom container images, such a new custom container image version building upon the corresponding new base container image version. Typically, a user manually generates these new custom container image versions. Such an approach is often burdensome, inefficient, or even impractical for the user, resulting in poor user experience.

In view of the foregoing, a need exists for an improved system and method for creating a new version of a custom container image when there is a new version of a corresponding base container image, in an effort to overcome the aforementioned obstacles and deficiencies of conventional approaches.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

The inventors of the present application have found that, conventional manual generation of a custom container image often proves problematic. For example, in order to be motivated to perform such generation of a new custom container image version, the user typically needs to be aware of the corresponding base container image deprecation (e.g., due to being aware of a corresponding change in backend version). As such, careful and tedious monitoring of changes to base container images can be demanded of the user. Where the user is responsible for a multitude of custom container images that inherit from a multitude of base container images, such responsibilities can prove unfeasible. As another example, in order to perform such manual generation of the custom container image, the user typically needs to have administrative privileges (e.g., administrative privilege that provides access to a private token called for in order to access and/or build upon base container images).

According to various embodiments, a new version of a custom container image can be created in a more satisfactory way when there is a new version of a corresponding a base container image. In particular, a system can receive a request to run a custom container image that is built upon a base container image. In various embodiments, the request to run the custom container image can come from a user via an external Application Programming Interface (API). For example, a user wants to use a base container, but with custom modifications specified by user including, but not limited to, system libraries, third-party libraries, and/or other dependencies that the user needs to add to the base container. Subsequently, the system can determine whether the custom container image is built upon the most recent version of the base container image. Where the system ascertains that the custom container image is built upon the most recent version of the base container image, the system can run the custom container image.

Where the system instead determines that the custom container image is not built upon the most recent version of the base container image, the system can create a new version of the custom container image that is built upon the most recent version of the base container image.

To support this functionality, during an initial creation of the custom container image, the system can perform a registration operation. In the registration operation, the system can receive registration information. The registration information can include the particularities of how the custom container image adds, removes, and/or replaces container elements (e.g., libraries, software packages, tools, and/or configuration files) relative to the base container image. Stated somewhat differently, the registration operation can provide a definition of a new custom image from the user to the system. The registration operation can specify a way in which the system should build upon the base container image. The registration information can allow the system to create the noted new version of the custom container image.

Having created the new version of the custom container image, the system can run the new version of the custom container image, thereby satisfying the request. Further, subsequent requests to run the custom container image can utilize this new custom container image version, for as long as this new custom container image version remains being based upon the most recent version of the base container image. Various aspects will now be discussed in greater detail.

Figure 1:
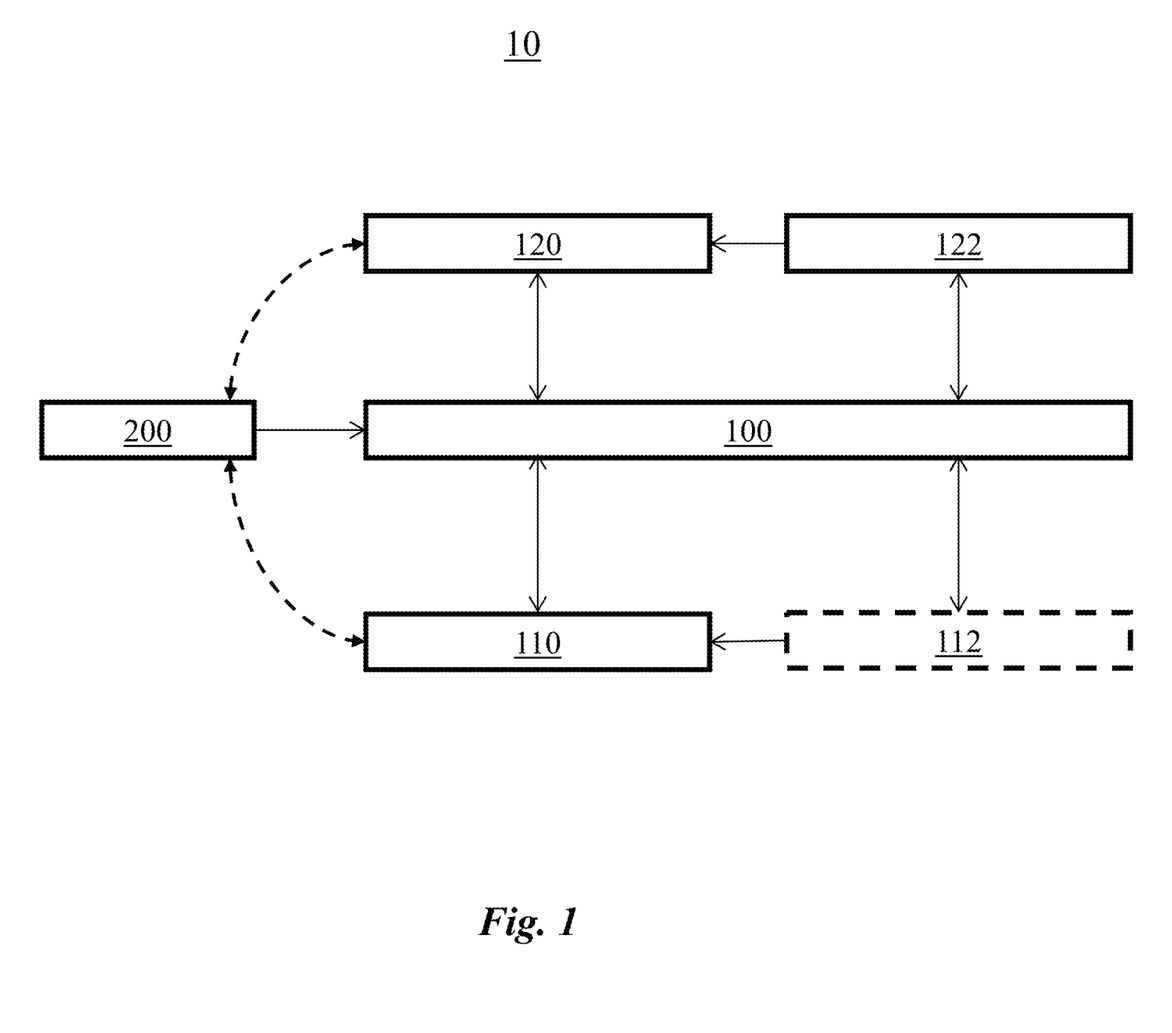
FIG. 1 shows an exemplary diagram illustrating an embodiment of a system for upgrading a container image.

Turning to FIG. 1, a schematic diagram of a system 100 for upgrading container images in an environment 10 is shown. The system 100 can be configured, based upon a request 200 for running a custom container image, to upgrade the custom container image. The upgrading can include upgrading a "current custom container image" (or "current version of the custom container image," or "current version of the requested custom container image") 110 by generating a "new version of the custom container image" (or "new version of the requested custom container image") 120.

Upon receiving a request 200 from a user for running a custom container image, the system 100 can determine whether the current version of the custom container image 110 is built upon the most recent base container image (or "the most recent version of the corresponding base container image" or "the most recent version of the base container image") 122. In various embodiments, the current version of the custom container image 110 is based upon a current base container image (or "current version of the corresponding base container image" or "current version of the base container image") 112. In some embodiments, the current version of the custom container image 110 is a newly and/or initially created version. In other embodiments, the current version of the custom container image 110 is not a newly or initially created version, but is instead generated as a result of upgrading an earlier version of the custom container image (not shown).

In various embodiments, the current version of the custom container image 110 is built upon the current version of the corresponding base container image 112 that is outdated relative to the most recent version of the corresponding base container image 122. Accordingly, the system 100 can upgrade the current version of the custom container image 110. Stated somewhat differently, the system 100 can generate a new version of the custom container image 120. The new version of the custom container image 120 is based upon the most recent version of the corresponding base container image 122. Accordingly, the new version of the custom container image 120 can be the upgraded and/or new version of the requested custom container image.

In various embodiments, the base container image can include executable codes for running a process to achieve a purpose. The base container image can be in the form of a selected version. Execution and/or operation on the base container image can be performed via execution and/or operation of the selected version. Similarly, the custom container image can include executable codes for running a process to achieve a specific purpose, build on the base container image and can be recognized by the user based upon the specific purpose. The custom container image can exist in the form of a selected version. Execution and/or operation of the custom container image can be performed via execution and/or operation of the selected version.

Figure 2:
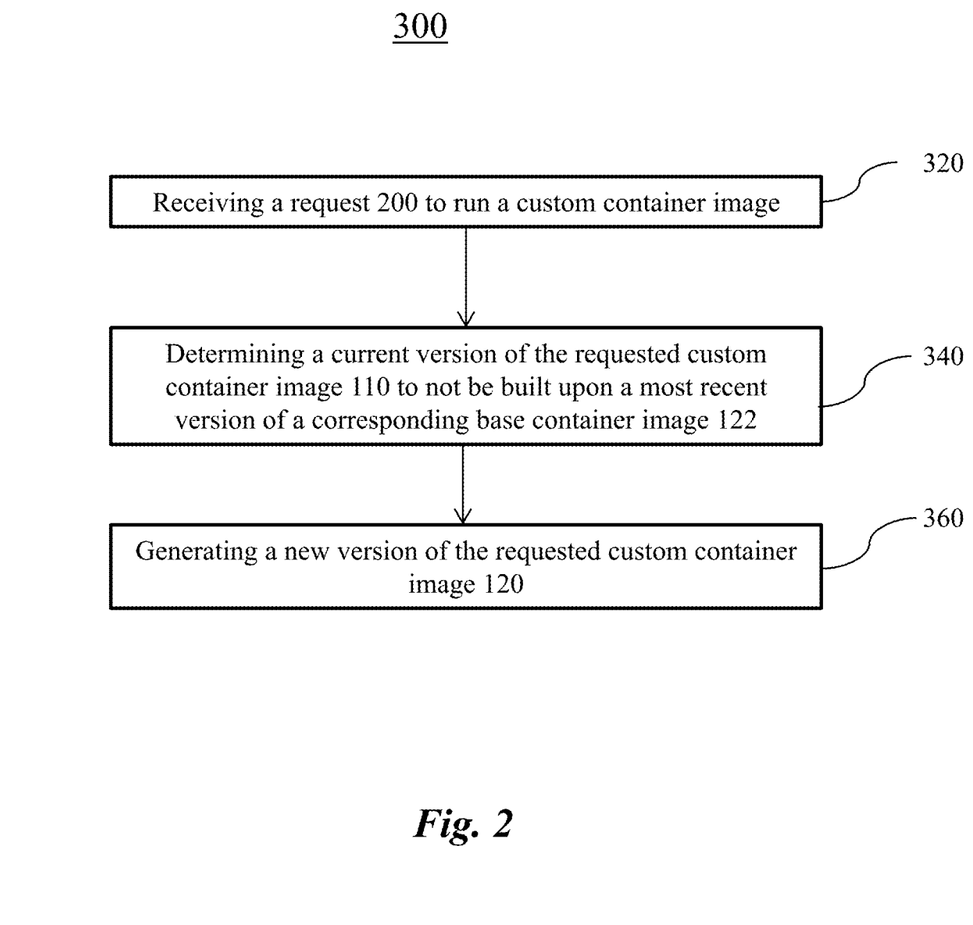
FIG. 2 is an exemplary flow chart illustrating an embodiment of a method for upgrading the container image using the system of FIG. 1.

Turning to FIG. 2, an exemplary method 300 for upgrading container images using the system 100 is shown. The system 100 can receive, at 320, the request 200 to run the custom container image. The system 100 can determine, at 340, the current version of the requested custom container image 110 to not be built upon the most recent version of the corresponding base container image 122. The system 100 can generate, at 360, the new version of the requested custom container image 110.

Figure 3:
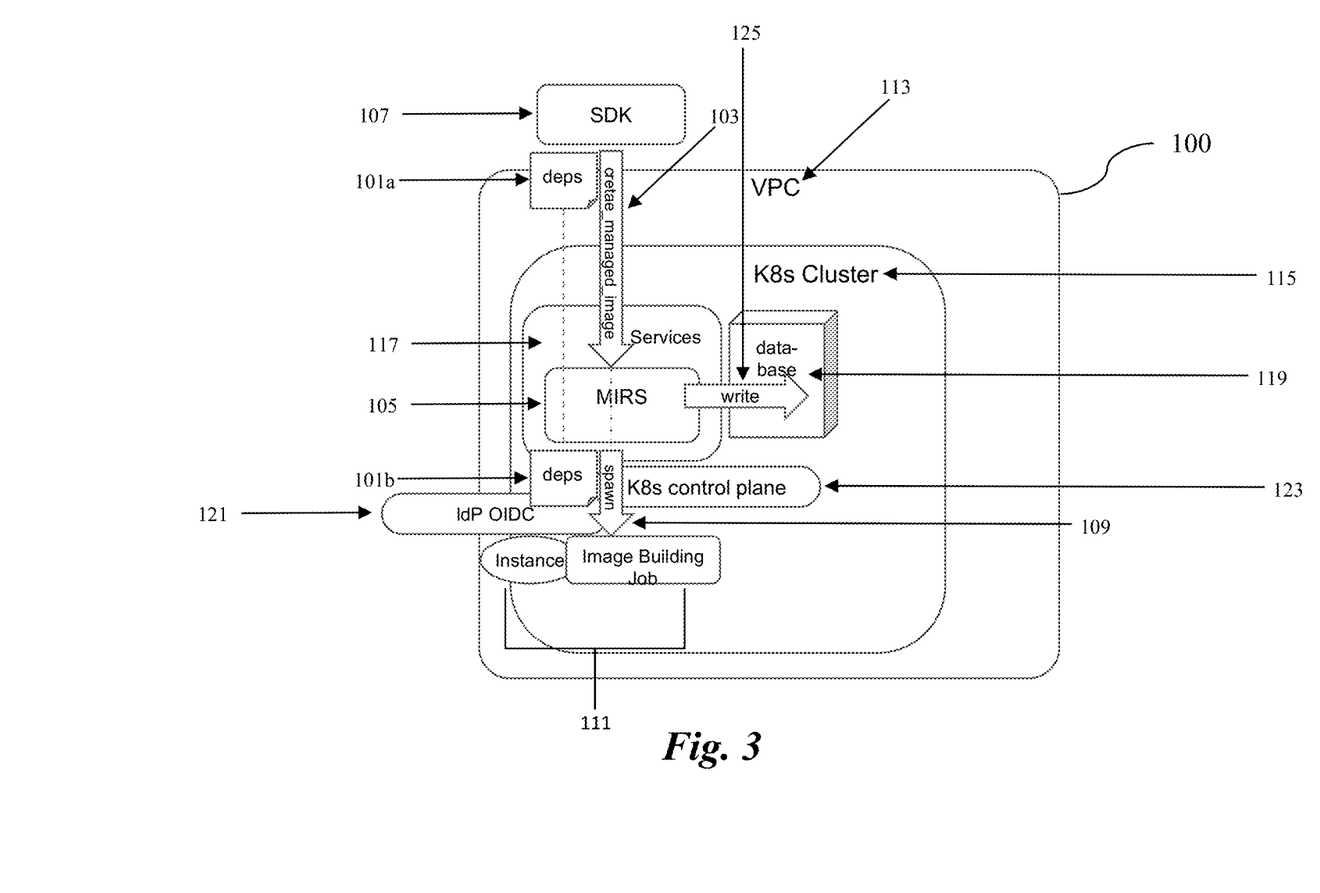
FIG. 3 shows a high-level architecture diagram regarding a registration operation and initial creation of a custom container image, according to various embodiments.
Figure 4:
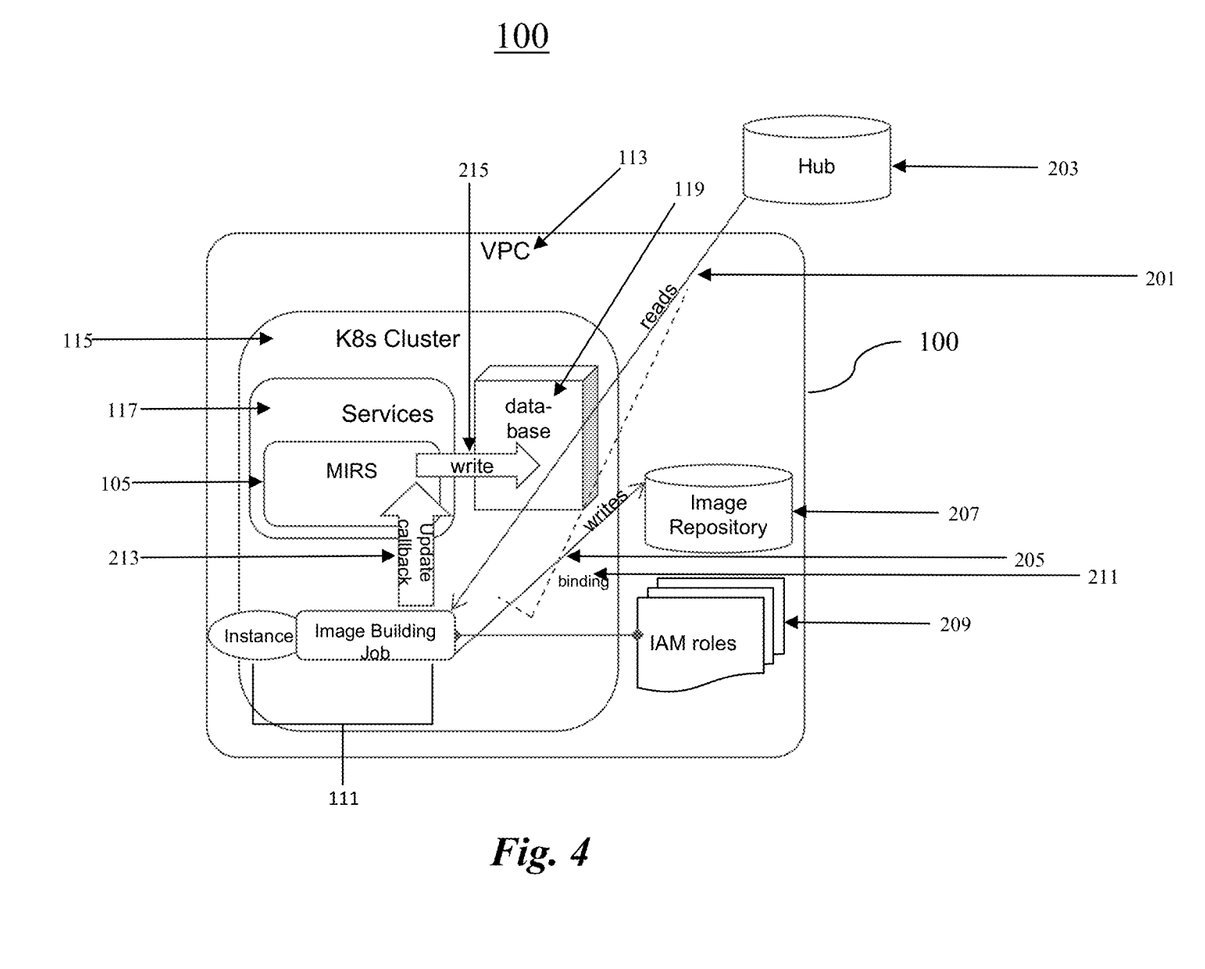
FIG. 4 shows a high-level architecture diagram further regarding a registration operation and initial creation of a custom container image, according to various embodiments.

With reference to FIG. 3 and FIG. 4, the noted registration operation and the noted initial creation of a custom container image will now be discussed in greater detail. During the registration operation (not shown), the system 100 can receive registration information 140 (shown in FIG. 8) indicating a base container image (not shown) that a new custom container image is to be built upon.

In various embodiments, the registration information 140 can include specification of the base container image. Exemplary specification can include a name of the base container image.

Additionally and/or alternatively, the stored registration information 140 can include specifications of the system dependencies required to build a new image. In various embodiments, the system 100 can receive the registration information 140 from the user specifying the customizations that the user needs to apply to a base container image. Such customizations can be achieved by implementing one or more customization actions (not shown). A customization action can include a process and/or step for customizing at least one aspect and/or part of the base container image. The registration information 140 can include specification of the ways in which the new custom container image is to add, remove, and/or replace container elements relative to the base container image. Stated somewhat differently, the customization actions can include adding, removing, and/or replacing container elements relative to the base container image. As an illustration, the registration information 140 can indicate a set of software package dependencies (e.g., a particular version of PyTorch) that are required by program code of the custom container image in addition to those container elements (e.g., libraries) provided by the base container image.

Further included in the registration information 140 can be a nickname (or nick) specified for the new custom container image. Stated somewhat differently, the nick can be a way for the user to refer to the customizations associated with, and specific for, the custom container image. An exemplary nick can remain associated with the custom container image regardless of upgrades of the version of the corresponding base container image, or the upgrades of the version of the custom container image. The various registration information 140 (e.g., nick for the new custom container image) can be provided by the user.

The registration information 140 (also labeled "deps" 101a/101b in FIG. 3) can be passed via a create_managed_image invocation 103 to the Managed Image Registry Service (MIRS) 105, using an API or software development kit (SDK) 107 (shown in FIG. 3). In particular, element 101a depicts the registration information 140 as passed from API or SDK 107, while element 101b depicts the registration information 140 as received by MIRS 105.

To service the request to create the new custom container image (or an initial version of the custom container image), the MIRS 105 can spawn (109) an image building job instance 111. The image building job instance 111 can perform the initial creation of the new custom container image, building upon the base container image specified by the registration information 140, and adding, removing, and/or replacing container elements (e.g., adding program code and software package dependencies) as specified by the registration information 140. In performing the initial creation of the new custom container image, the image building job instance 111 can read (201) the base container image from a hub 203, and can write (205) the new custom container image to image repository 207. The hub 203 can include a repository of container images. In various embodiments, the image repository 207 can be hosted on a suitable platform for developing, shipping, and running applications. An exemplary hub 203 can include a Docker hub.

The discussed functionality can operate in connection with a Virtual Private Cloud (VPC) 113 and a cluster 115. The cluster 115 can include a group of two or more computers, or nodes, that run in parallel to implement the system in an orchestrated manner. An exemplary cluster 115 can include a K8s cluster. The MIRS 105 can, in some embodiments, run as part of services 117. In other embodiments MIRS 105 does not run as part of services 117. Also depicted in FIG. 3 and FIG. 4 is a database 119, which can be used to store the received registration information 140. Database 119 can be, as just one example, a Mongo database. Also depicted are OpenID Connect Identity Provider (IdP OIDC) 121 and a control plane 123. The IdP OIDC 121 can act in concert with Identity and Access Management (IAM) roles 209 to employ role binding (211) to grant/deny various authorities, including the authorities to access database 119, hub 203, and image repository 207. The control plane 123 can include a control plane for any suitable orchestration system. The control plane 123 can perform operations including managing worker nodes and/or pods in the cluster 115. An exemplary control plane 123 can include a K8s control plane. The control plane 123 can perform operations including managing K8s worker nodes and pods in the cluster 115.

As noted, the database 119 can be used to store the received registration information 140. More specifically, upon completion of creating the new custom container image, the image building job instance 111 can, after writing the new custom container image in the image repository 207, issue an update callback 213 to MIRS 105, to announce that the custom container image has been successfully created. In response to the update callback 213, MIRS 105 can perform the noted storage (labeled "write" 215) of the received registration information 140 in the database 119. In some embodiments, such storage can involve metadata storage and/or update of existing metadata. In various embodiments, the storage of the received registration information 140 in the database 119 can be performed at a different juncture (or time, stage, event, or circumstance). Stated somewhat differently, the received registration information 140 can be stored in the database 119 at any suitable time, without limitation. In various embodiments, the registration information 140 can be stored in the database 119 at any suitable time associated with creation of the new custom container image and/or associated with upgrading the custom container image (or stale image) that is based upon an out-of-date version of the base container image. For example, the registration information 140 can be stored in the database 119 before the callback 213. Additionally and/or alternatively, the storage of the received registration information 140 in database 119 (write 215) can, in some embodiments, be preceded by a creation (labeled "write" 125) of an initial database entry for the new custom container image. In these embodiments, write 215 can act to update this initial database entry. The creation of the initial database entry can provide benefits including allowing preliminary record of the new custom container image to exist even under circumstances where write 215 does not arrive or otherwise fails.

Figure 5:
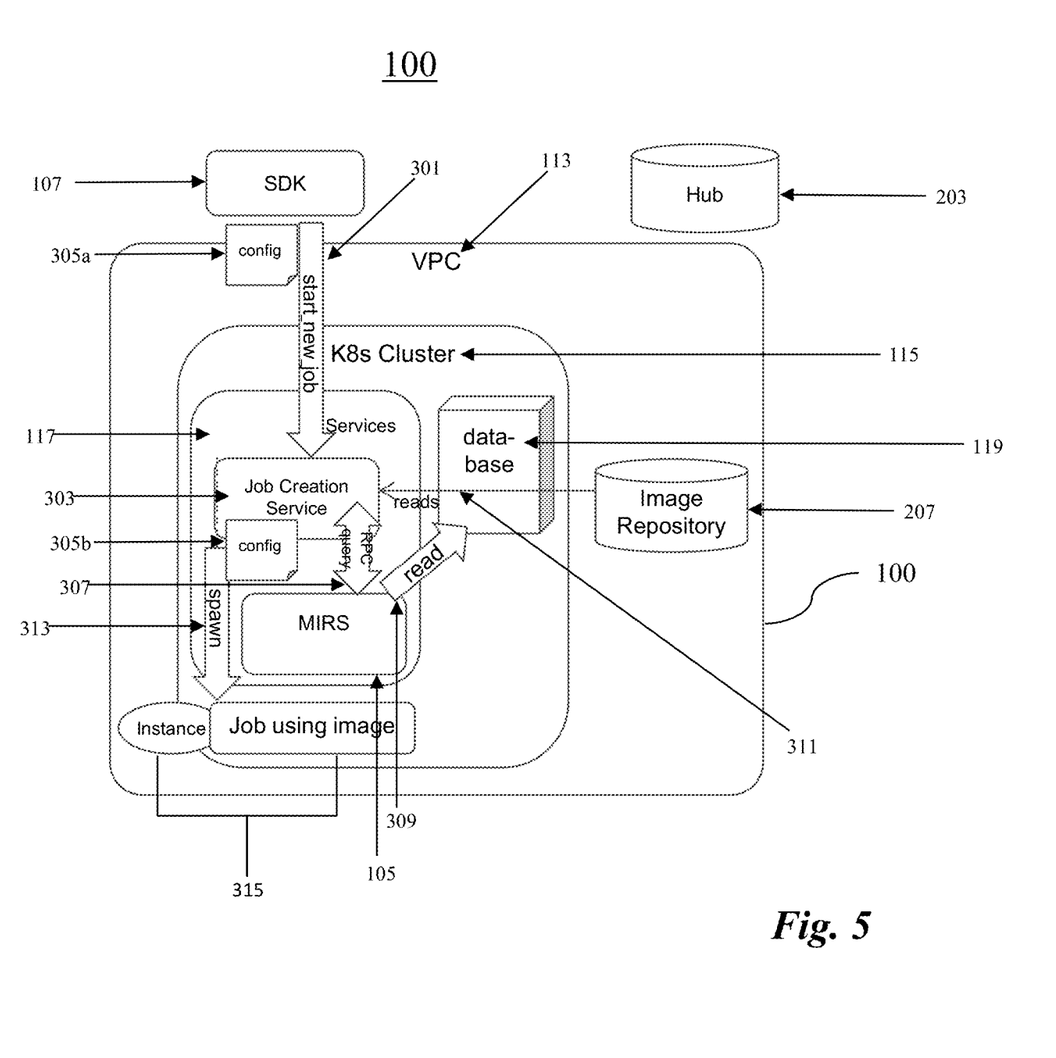
FIG. 5 shows a high-level architecture diagram regarding handling of a request to run a previously-created custom container image, according to various embodiments.
Figure 6:
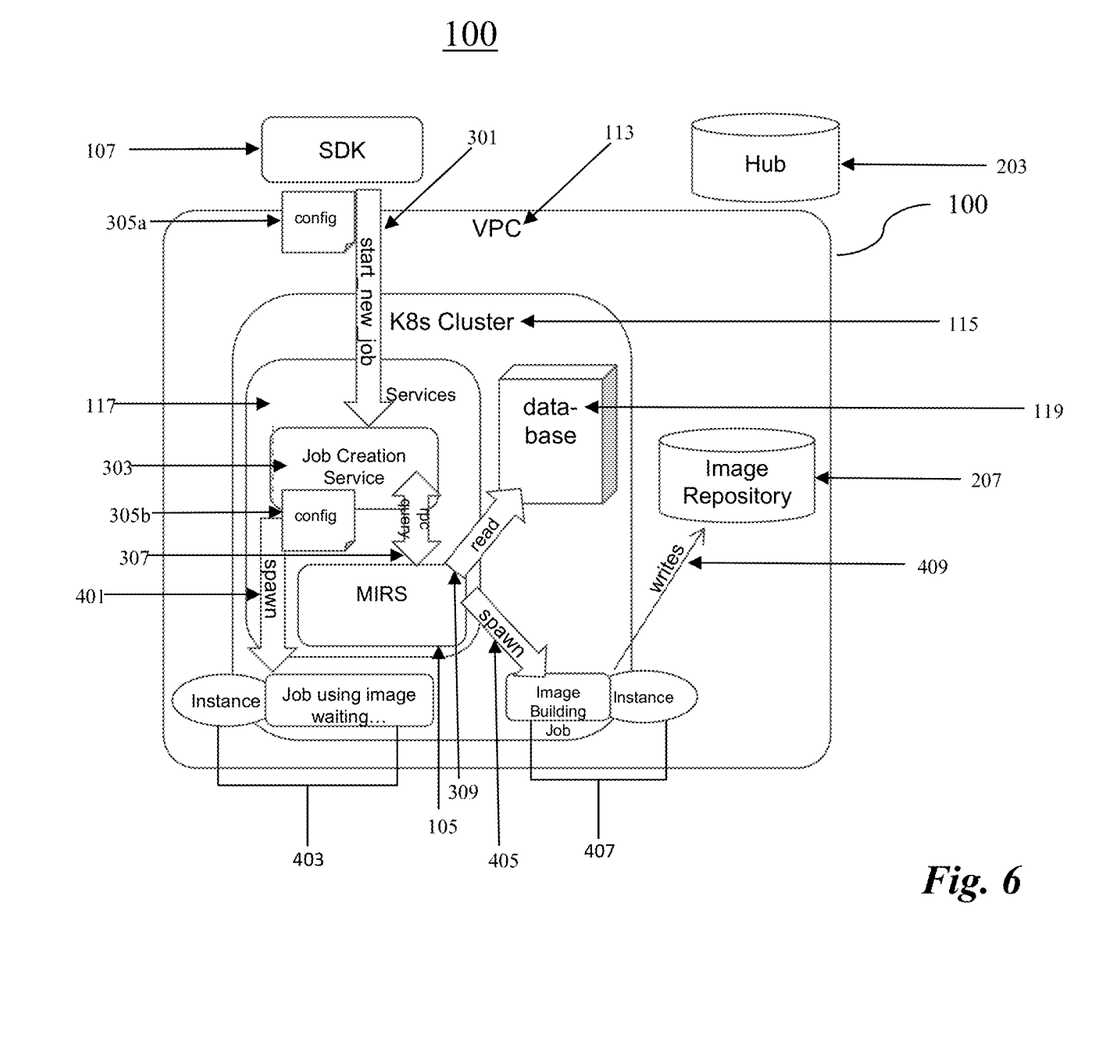
FIG. 6 shows a high-level architecture diagram further regarding handling of a request to run a previously-created custom container image, according to various embodiments.
Figure 7:
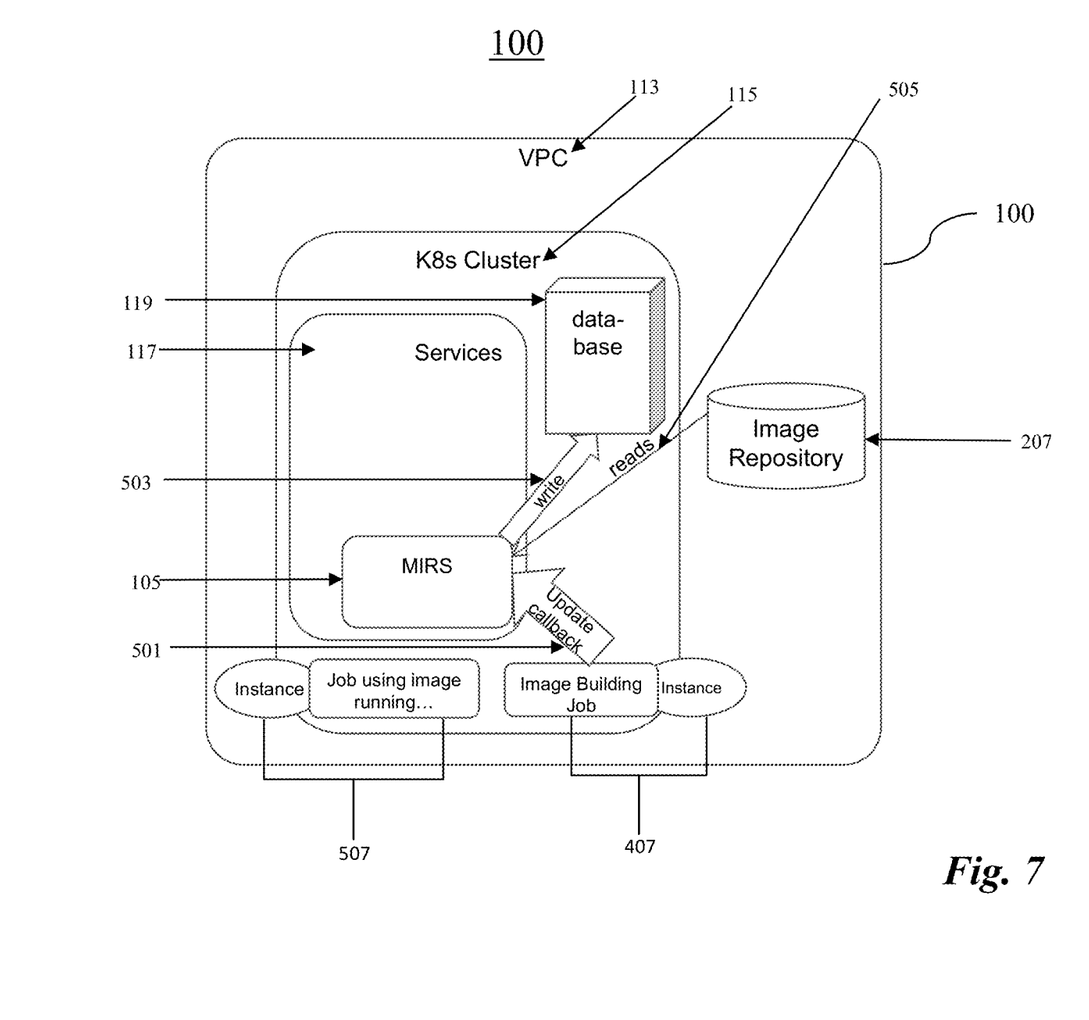
FIG. 7 shows a high-level architecture diagram additionally regarding handling of a request to run a previously-created custom container image, according to various embodiments.

With reference to FIG. 5, FIG. 6, and FIG. 7, the noted handling of a request to run a given previously-created custom container image will now be discussed in greater detail.

Where there is a desire to run the previously-created custom container image, the system 100 (shown in FIG. 1) can receive a corresponding request 200 (shown in FIG. 1) to run. As just an example, the running of the custom container image can include running a K8s job which utilizes the custom container image. Running as such a K8s job, program code of the custom container image can, as just an example, run as part of a K8s pod until a successful or unsuccessful termination (e.g., exit with 1 or 0, respectively).

Included in the run request can be indication of the nick that was specified for the custom container image when it was initially created. A run request (labeled as "config" 305a/305b in FIG. 5 and FIG. 6) can be passed via an invocation 301 (labeled "start_new_job") to a Job Creation Service (JCS) 303, using the API or SDK 107. In particular, the element 305a depicts the run request as passed from API or SDK 107, while the element 305b depicts the run request as received by JCS 303. Subsequently, the JCS 303 can use the received nick to request 307 (labeled "remote procedure call (RPC) query" in FIG. 5 and FIG. 6) the corresponding custom container image 110 from MIRS 105. As reflected by the noted label (i.e., "RPC query"), this request can be implemented via a Remote Procedure Call (RPC).

Having received the request 307, the MIRS 105 can determine whether the current version of the requested custom container image 110 is built upon the most recent version of the corresponding base container image 122. As just an example, the MIRS 105 can make this determination by accessing the current version of the requested custom container image 110 via the image repository 207, and examining the overlay system-based structure of the current version of the requested custom container image 110 in order to determine whether it builds upon the most recent version of the corresponding base container image 122. In various embodiments, the most recent version of the base container image 122 can be provided to the MIRS 105 itself upon instantiation of the MIRS 105. Stated somewhat differently, the MIRS 105 can be programmed to keep track of the latest version of base container images. In a non-limiting example, the most recent version of the base container image 122 can be coupled with the version of MIRS 105. Stated somewhat differently, the most recent version of the base container image 122 can be supplied to the MIRS 105 externally and/or as a part of the deployment of the MIRS 105.

Where the MIRS 105 ascertains that the current version of the requested custom container image 110 is built upon the most recent version of the corresponding base container image 122, the MIRS 105 can, as depicted by FIG. 5, provide JCS 303 with information that can allow JCS 303 to access the current version of the requested custom container image 110 from the image repository 207. Such information can include the K8s tag and/or K8s name of the current version of the requested custom container image. The MIRS 105 can learn of this information by reading (309) from the database 119. The database 119 can, as just an example, store correlations between the registration information 140 for custom container images (e.g., nicks specified during initial creation) and information (e.g., K8s tags and/or K8s names) that allows such custom container images to be obtained from image repository 207.

Subsequently, JCS 303 can use the noted information (e.g., K8s tag and/or K8s name) to read (311) the current version of the requested custom container image from image repository 207, and run (313) (labeled "spawn" in FIG. 5) an instance of that custom container image (315). As just an example, the running of current version of the requested custom container image 110 can involve JCS 303 running a K8s job which utilizes program code of the custom container image, and which has that program code acting upon specified input data (e.g., input data specified via API or SDK 107). In some embodiments, such input data can be communicated to a backend system (not shown), and the backend system can link the inputs to the custom container image and launch the custom container image.

As shown in FIG. 6, where the MIRS 105 instead ascertains that the current version of the requested custom container image 110 (shown in FIG. 1) is not built upon the most recent version of the corresponding base container image 122 (shown in FIG. 1), the JCS 303 can spawn (401) a pending instance of the requested custom container image (403) that can wait until a new version of the requested custom container image 120 (shown in FIG. 1) is ready, such new version of the requested custom container image 120 being built upon the most recent version of the corresponding base container image 122. As just an example, such pending instance of the requested custom container image can involve a pending K8s job set to use program code of the requested custom container image.

Subsequently, in order to generate such a new version of the requested custom container image 120, the MIRS 105 can spawn (405) an image building job instance 407. For instance, MIRS 105 can automatically launch the image building job instance 407 to create a new version of the requested custom container image 120, without user intervention. The image building job instance 407 can, in a first aspect, generate the new version of the requested custom container image 120 such that the new version of the requested custom container image 120 builds upon the most recent version of the corresponding base container image 122. In a second aspect, the image building job instance 407 can generate the new version of the requested custom container image 120 such that appropriate container elements are added, removed, and/or replaced, relative to the most recent version of the corresponding base container image 122.

The identity of the corresponding base container image, and also indication of the container element additions, removals, and replacements, can be stored in database 119 during the initial creation of the requested custom container image, as received registration information 140. As such, the image building job instance 407 can learn of the base container image and of the container element additions, removals, and replacements by retrieving the stored registration information 140 from database 119.

Further, the image building job instance 407 can read the registration-information-specified base container image from the hub 203, generate the new version of the requested custom container image 120 such that the registration-information-specified container elements are added, removed, and/or replaced), and can write (409) the generated new version of the requested custom container image 120 to image repository 207.

As shown in FIG. 7, subsequently, the image building job instance 407 can provide an update callback 501 to the MIRS 105 to indicate that the new version of the requested custom container image 120 has been successfully created. The MIRS 105 can then write (503) to the database 119 so as to update the state of the requested custom container image so that subsequent directives to run that custom container image can use the new version thereof. In particular, this update of state can include correlating in database 119 the nick of the requested custom container image with information (e.g., K8s tags and/or K8s names) specifying the new version of the custom container image 120. Also in response to the update callback 501, MIRS 105 can read (505) the generated new version of the requested custom container image 120 from the image repository 207 and run an instance 507 of the new version of the requested custom container image 120, thereby shifting pending instance 403 to a running state. Where the pending instance 403 involves a pending K8s job, the pending K8s job can thereby be shifted to a running state.

Figure 8:
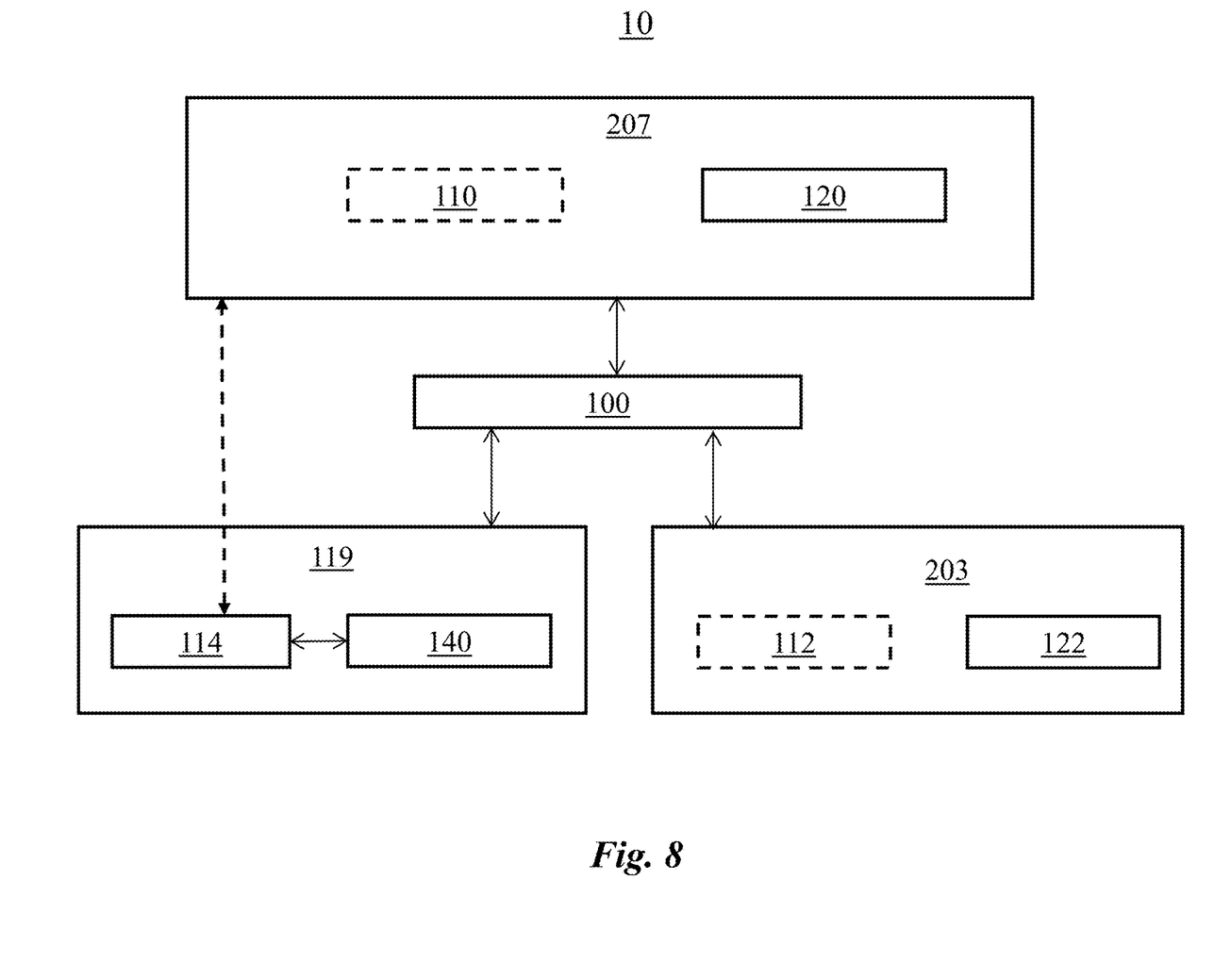
FIG. 8 shows an exemplary diagram illustrating relations among the system and other components for storing data, according to various embodiments.

Turning to FIG. 8, FIG. 8 is a schematic diagram of the environment 10 illustrating exemplary relations among the system 100 and selected components storing data and/or files in accordance with exemplary processes set forth in FIGS. 3-7. The exemplary database 119 is shown as storing the registration information 140 for custom container images (e.g., nicks specified during initial creation) and identification information 114 (e.g., K8s tags and/or K8s names) that allows one or more versions of the custom container images to be obtained from the image repository 207, and correlations therebetween.

The identity of the corresponding base container image, and also indication of the container element additions, removals, and replacements, can be stored in the database 119. The hub 203 can include a repository of container images including one or more versions of the base container image. Optionally, upon generation of the new version of the requested custom container image 120, the earlier (and/or outdated) version(s) of the custom container image 110 can be removed from the image repository 207. Additionally and/or alternatively, the earlier (and/or outdated) version(s) of the corresponding base container image can be removed from the hub 203 at any suitable time.

Although FIG. 8 shows the image repository 207, the database 119 and the hub 203 as being outside of the system 100 for illustrative purposes only, the repository 207, the database 119 and/or the hub 203 can be a part of the system 100, without limitation. Although FIGS. 3-7 each shows the system 100 as including the MIRS 105 and various other components such as the repository 207, the JCS 303, the database 119, and/or the like for illustrative purposes only, the system 100 can include any uniform and/or different computational units and/or storage units for implementing the functions as set forth above, without limitation. In some embodiments, the system 100 can include the MIRS 105 and the MIRS 105 can be configured to implement one or more of, some of, or all of the functions of the system 100 as set forth above, without other components as being necessary. For example, the system 100 can include the MIRS 105 only.

As discussed, the database 119 can store any suitable information, such as the registration information 140 and correlations (e.g., correlating nicks with K8s tags and K8s names). In this way database 119 (and MIRS 105, by virtue of its ability to access the database 119) can maintain information (e.g., metadata) about the fleet of custom container images managed by MIRS 105. Then, as referenced above, where there is a run request to run a previously-created custom container image, MIRS 105 can use this information when determining whether the current version of the requested custom container image 110 is built upon the most recent version of the corresponding base container image 122. Where MIRS 105, having utilized the information, ascertains that the current version of the requested custom container image 110 is not built upon the most recent version of the corresponding base container image 122, a new version of the requested custom container image 120 can be created. As such, because of the information, various benefits can accrue. For example, when a backend system (e.g., a Robust Intelligence Model Engine (RIME) backend) is changed to run a new version, each managed custom container image can, upon its re-use following that backend change, also be automatically updated so that each managed custom container image can build upon the latest version of the base container image that corresponds to the backend's version. The base container image can, as just some examples, provide protocols, data format support, and/or configuration parameters that allow the custom container image to connect to services running in a backend system. And, as an example, a backend system change can regard changes to such protocols, data formats, and/or configuration parameters.

As discussed, where the MIRS 105 ascertains that the current version of a requested custom container image 110 is not built upon the most recent version of the corresponding base container image 122, MIRS 105 can, in generating a new version of the requested custom container image 120, read the registration-information-specified base container image from the hub 203. Accessing the hub 203 in order to pull this base container image can require a private access token and/or administrative privileges (e.g., in order to restrict access to the base container image, in the interest of security). As such, in further detail, the MIRS 105 can possess such private access token and/or such administrative privileges. Additionally and/or alternatively, MIRS 105 can, in applying the token and/or the administrative privileges, enforce various restrictions. In some embodiments, the MIRS 105 can configure the private access token and/or administrative privileges to specify access control restrictions on the MIRS 105 itself, such that MIRS 105 only accesses contents that are necessary for creating and/or upgrading container images. As examples, the MIRS 105 can: 1) allow only publicly-available container elements (e.g., dependencies) to be accessed; 2) allow only those container elements specified during initial custom container image creation to be accessed; and/or 3) allow only the new version of that base container image (that was specified during initial custom container image creation) to be accessed. It is noted that, in various embodiments, initial creation of a custom container image can be initiated by a user with administrative privileges. Also, in various embodiments, the request 200 to run a previously-created custom container image, and/or generation of a new version of the requested custom container image 120, can be initiated by a user not possessing administrative privileges to the hub 203.

As such, various benefits can accrue. For example, on one hand, a non-privileged (e.g., non-administrator) user requesting a custom container image found to not be built upon the most recent version of the corresponding base container image 122 can, leveraging the private access token and/or administrative privileges of MIRS 105, nevertheless be able to generate a new version of the requested custom container image 120, built upon the most recent version of the corresponding base container image 122. Yet, on the other hand, the MIRS 105 can enforce various restrictions on the MIRS 105 itself as discussed, thereby promoting responsible security practices. By allowing non-administrator users to generate the new version of the requested custom container image 120, benefits including lessening burden administrator users to manage custom container images can accrue. Accordingly, the non-administrator users can benefit from the access to the functions as set forth above via the MIRS 105.

According to the approaches discussed herein, the MIRS 105 can determine whether a requested custom container image is built upon the most recent version of the corresponding base container image 122, and can generate a new version of the requested custom container image 120 if needed. Such functionality yields a multitude of benefits.

For example, custom container images can be relied upon to be up-to-date when used. In contrast, according to conventional approaches users are burdened with having to manually ensure that their custom container images are up-to-date whenever they use them (e.g., because the at-hand backend is possibly no longer compatible with their custom container image). Beneficially, according to the approaches discussed herein, MIRS 105 can handle versioning of custom container images (e.g., ensuring that each custom container image used is compatible with the current version of the relevant backend). Although versioning of software code can be done in other aspects of computer operations, creating and/or versioning container images within an orchestration system is often difficult because an orchestration system often requires building custom container images for arbitrary client requests. Without the method as disclosed herein, the orchestration systems could only build custom images as a one-off, unautomated and non-methodical solution, or would have to require the users to maintain the custom images themselves, resulting in burdens on the user and inefficiency in the orchestration system.

As another example, custom container images can be ensured to be patched with the latest security updates. According to conventional approaches, users have to manually ensure that their custom container images are upgraded to be based on the latest secure versions of corresponding base container images each time when vulnerabilities were disclosed in the corresponding base container images. In contrast, according to the approaches discussed herein, custom container images can beneficially be automatically upgraded to be based on latest corresponding base container images (e.g., thereby enjoying the security patches of those latest corresponding base container images).

As yet another example, custom container images can be updated when they need to be used. According to conventional approaches, when a given base container image was updated (e.g., in connection with a new version of a corresponding backend), all custom container images built upon that base container image were typically updated. Such conventional approaches, by upgrading all custom container images built upon an out-of-date base container image, tend to waste resources for at least the reason that many of such custom container images are no longer in use. In contrast, according to the approaches discussed herein, custom container images can be upgraded when requested to be used. In doing so, benefits including reducing the resources used to maintain custom container images can be enjoyed.

As such, the functionality discussed herein can act to update custom container images when they are needed, thereby allowing users to use their managed custom container images at any time while, as just some examples: 1) removing a call to schedule special upgrade procedures; 2) only upgrading those custom container images that are actually in need of update; and 3) minimizing the resources required for custom container image upgrade. The functionality wherein custom container images can be updated when they need to be used can, as just one example, include lazy updating. Accordingly, the method as disclosed herein can maintain, for a client, a fleet of container images that is constructed lazily as opposed to manual processes. The system 100 as disclosed herein can meet a need to accommodate users of a non-privileged client. Without the method as disclosed herein, such users would have to ask an administrator for such image construction within the organization of the client.

As also discussed, according to the approaches discussed herein a nick (i.e., nickname) can be specified for a custom container image. Using this functionality, users, the JCS 303, and other entities can refer to managed custom container images using these simple nicks, which can be user-specified names. MIRS 105 can use such a nick in connection with database 119 to find, for instance: a) the K8s name of the corresponding custom container image; b) the K8s tag of the corresponding custom container image; and/or c) the K8s version/variant identifier of the corresponding custom container image. Using such information, the system 100 can run the corresponding custom container image (e.g., such run allowing for the launch of K8s jobs that utilize that custom container image). Further, such nicks can be used in updating custom container images.

In some embodiments, JCS 303 can be termed a Model Testing Service, the element 117 can be termed RIME services, and the run-request-passing invocation 301 can be termed start_stress_test. As such, the functionality discussed herein can be used in connection with machine learning operations, for instance where custom container images provide and/or support machine learning models (MLMs), and where specified input data includes machine learning-related datasets and/or parameters. However, such application of the functionality discussed herein is for illustrative purposes, and the functionality discussed herein is generally applicable to circumstances where base container images and custom container images are utilized.

Although various embodiments refer to components, data, actions, or processes of the system 100 (for example, K8s job, K8s pod, K8s tag, K8s name, K8s version and/or K8s variant identifier) as being used K8s systems for illustrative purposes only, such components, data, actions, or processes can include any equivalent applicable to any other one or more uniform and/or different suitable orchestration systems, without limitation.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 9:
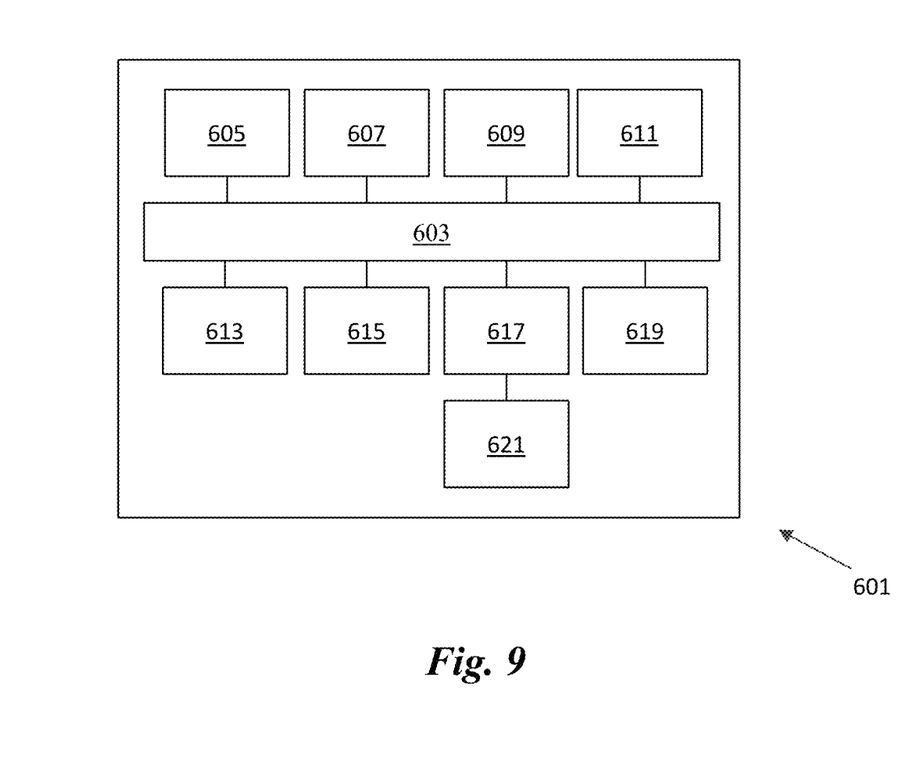
FIG. 9 shows an example computer, according to various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 9 is an example computer employable in various embodiments of the present invention. Exemplary computer 601 includes system bus 603 which operatively connects two processors 605 and 607, random access memory (RAM) 609, read-only memory (ROM) 611, input output (I/O) interfaces 613 and 615, storage interface 617, and display interface 619. Storage interface 617 in turn connects to mass storage 621. Each of I/O interfaces 613 and 615 can, as just some examples, be a Universal Serial Bus (USB), a Thunderbolt, an Ethernet, a Bluetooth, a Long-Term Evolution (LTE), a fifth generation of mobile communications (5G), an Institute of Electrical and Electronics Engineers (IEEE) 488, and/or other interface. Mass storage 621 can be a flash drive, a hard drive, an optical drive, or a memory chip, as just some possibilities. Processors 605 and 607 can each be, as just some examples, a commonly known processor such as an ARM-based or x86-based processor. Computer 601 can, in various embodiments, include or be connected to a touch screen, a mouse, and/or a keyboard. Computer 601 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules can, for example, be programmed using Python, Java, JavaScript, Swift, C, C++, C #, and/or another language. Corresponding program code can be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module can instead be performed by a plurality of software modules. Similarly, any operations indicated as being performed by a plurality of modules can instead be performed by a single module. It is noted that operations indicated as being performed by a particular computer can instead be performed by a plurality of computers. It is further noted that, in various embodiments, peer-to-peer and/or grid computing techniques may be employed. It is additionally noted that, in various embodiments, remote communication among software modules may occur. Such remote communication can, for example, involve JavaScript Object Notation-Remote Procedure Call (JSON-RPC), Simple Object Access Protocol (SOAP), Java Messaging Service (JMS), Remote Method Invocation (RMI), RPC, sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High-Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

RAMIFICATIONS AND SCOPE

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

The invention claimed is:

1. A computer-implemented method for upgrading a container image, comprising:
identifying, by a computing system, registration information corresponding to a base container image, wherein the registration information comprises particularities of how to modify container elements of the base container image to create a custom container image;
creating, by the computing system, the custom container image based upon the registration information;
receiving, by a computing system, a request to run the custom container image;
determining, by the computing system, a current version of the requested custom container image to not be built upon a most recent version of the corresponding base container image;
obtaining the registration information from storage in response to the determining; and
generating, by the computing system, a new version of the requested custom container image based upon the obtained registration information and the most recent version of the base container image.

2. The method of claim 1, wherein the new version of the requested custom container image builds upon the most recent version of the corresponding base container image.

3. The method of claim 2, wherein said generating includes performing customization relative to the most recent version of the corresponding base container image.

4. The method of claim 3, wherein the performing the customization includes performing one or more container element additions, one or more container element removals, one or more container element replacements, or a combination thereof, relative to the most recent version of the corresponding base container image.

5. The method of claim 3, wherein the performing is in accordance with the registration information, wherein the registration information indicates the customization associated with the custom container image.

6. The method of claim 5, wherein the registration information includes specification of the corresponding base container image.

7. The method of claim 5, further comprising accessing, by the computing system and before said generating, the registration information from a database.

8. The method of claim 5, further comprising creating, before said generating, the custom container image based upon the registration information.

9. The method of claim 8, wherein said creating includes performing a registration operation associated with the custom container image.

10. The method of claim 9, wherein the performing the registration operation includes receiving, by the computing system, the registration information.

11. The method of claim 8, wherein said creating includes performing the customization on the corresponding base container image, the corresponding base container image being indicated by the registration information.

12. The method of claim 1, wherein the request to run the custom container image is initiated by a user not possessing administrative privileges to a hub storing the corresponding base container image.

13. The method of claim 12, wherein said generating includes reading the most recent version of the corresponding base container image from the hub.

14. The method of claim 12, further comprising enforcing restrictions on the computing system for accessing the hub such that the computing system does not have access to the hub entirely.

15. The method of claim 1, further comprising running, by the computing system, the new version of the requested custom container image.

16. The method of claim 15, wherein said running includes running a Kubernetes job utilizing the new version of the requested custom container image.

17. A system for upgrading a container image, comprising:
a processor; and
a memory having one or more programs stored thereon for instructing said processor to:
identify registration information corresponding to a base container image, wherein the registration information comprises particularities of how to modify container elements of the base container image to create a custom container image;
create the custom container image based upon the registration information;
receive a request to run the custom container image;
determine a current version of the requested custom container image to not be built upon a most recent version of the corresponding base container image;
obtain the registration information from storage in response to the determining; and
generate a new version of the requested custom container image based upon the obtained registration information and the most recent version of the base container image.

18. The system of claim 17, wherein the new version of the requested custom container image builds upon the most recent version of the corresponding base container image.

19. A computer program product for upgrading a container image, the computer program product being encoded on more or more non-transitory machine-readable storage media and comprising:
instruction for identifying registration information corresponding to a base container image, wherein the registration information comprises particularities of how to modify container elements of the base container image to create a custom container image;
instruction for creating the custom container image based upon the registration information;
instruction for receiving a request to run the custom container image;
instruction for determining a current version of the requested custom container image to not be built upon a most recent version of the corresponding base container image;
instruction for obtaining the registration information from storage in response to the determining; and
instruction for generating a new version of the requested custom container image based upon the obtained registration information and the most recent version of the base container image.

20. The computer program product of claim 19, wherein the request to run the custom container image is initiated by a user not possessing administrative privileges to a hub storing the corresponding base container image.

* * * * *